(12) United States Patent
Shahriari et al.

(10) Patent No.: US 12,365,207 B2
(45) Date of Patent: Jul. 22, 2025

(54) METHODS AND SYSTEMS FOR ESTIMATING TRAILER TONGUE LOAD

(71) Applicant: GM GLOBAL TECHNOLOGY OPERATIONS LLC, Detroit, MI (US)

(72) Inventors: Mohammadali Shahriari, Markham (CA); Ashraf Abualfellat, Grand Blanc, MI (US); Michelle Zirngibl Taylor, Milford, MI (US); Lance G Lamson, Swartz Creek, MI (US); Reza Zarringhalam, Whitby (CA); Brian Porto, Wixom, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 281 days.

(21) Appl. No.: 18/191,390

(22) Filed: Mar. 28, 2023

(65) Prior Publication Data
US 2024/0326529 A1 Oct. 3, 2024

(51) Int. Cl.
*B60D 1/24* (2006.01)
(52) U.S. Cl.
CPC .................................. *B60D 1/248* (2013.01)
(58) Field of Classification Search
None
See application file for complete search history.

(56) References Cited

U.S. PATENT DOCUMENTS

| | | | |
|---|---|---|---|
| 2011/0049837 A1* | 3/2011 | Hapyuk | B60G 17/018 177/136 |
| 2012/0123646 A1* | 5/2012 | Mantini | B62D 61/12 73/488 |
| 2014/0085472 A1* | 3/2014 | Lu | B60R 1/26 348/148 |
| 2015/0264866 A1* | 9/2015 | Foster | B65G 67/04 414/21 |
| 2019/0283513 A1* | 9/2019 | Shepard | B60D 1/62 |
| 2023/0077074 A1* | 3/2023 | Anderson | B60D 1/247 |
| 2025/0026161 A1* | 1/2025 | Ricke | B60D 1/015 |

* cited by examiner

*Primary Examiner* — Matthew J. Reda
(74) *Attorney, Agent, or Firm* — Lorenz & Kopf LLP

(57) ABSTRACT

Methods and systems are provided for a vehicle. In one embodiment, a method includes: initiating, by a processor, steering excitation according to a pattern while the vehicle is stationary; learning, by the processor, a load associated with a front axle of the vehicle based on the steering excitation; translating, by the processor, the load associated with the front axle of the vehicle to a load associated with a tongue of a trailer, and generating, by the processor, a trailer tongue load value based on the load associated with the tongue of the trailer.

16 Claims, 3 Drawing Sheets

METHODS AND SYSTEMS FOR ESTIMATING TRAILER TONGUE LOAD

INTRODUCTION

The technical field generally relates to vehicles and, more specifically, to methods and systems for determining a load on a trailer tongue while coupled to a stationary vehicle and controlling the vehicle based on the determined load.

Trailer tongue load influences lateral vehicle dynamics. When the trailer tongue load is too much, sub-optimal lateral performance can be experienced. Most vehicles are not equipped with a sensor to directly sense the trailer tongue load. Adding additional sensors to directly sense the trailer tongue load increases cost and complexity of the vehicle.

Accordingly, it is desirable to provide methods and systems for determining the trailer tongue load without adding any additional sensors. Furthermore, it is desirable to provide methods and systems for determining the trailer tongue load prior to operation of the vehicle to improve automated performance of the vehicle. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for a vehicle. In one embodiment, a method includes: initiating, by a processor, steering excitation according to a pattern while the vehicle is stationary: learning, by the processor, a load associated with a front axle of the vehicle based on the steering excitation: translating, by the processor, the load associated with the front axle of the vehicle to a load associated with a tongue of a trailer; and generating, by the processor, a trailer tongue load value based on the load associated with the tongue of the trailer.

In various embodiments, the method further includes controlling an automated feature based on the trailer tongue load value.

In various embodiments, the method further includes generating display data based on the trailer tongue load value.

In various embodiments, the method further includes initiating the steering excitation based on automated control of the steering system.

In various embodiments, the method further includes initiating the steering excitation based on a notification to a driver of the vehicle to steer a steering wheel of the vehicle according to the pattern.

In various embodiments, the method further includes, in response to the initiating the steering excitation, evaluating movement of a front wheel, and wherein the learning is performed in response to the evaluating.

In various embodiments, the method further includes translating based a mapping model that maps the load associated with the front axle of the vehicle to the load associated with the tongue of the trailer.

In various embodiments, the method further includes learning the mapping model based on crowd sourced data.

In various embodiments, the load associated with the front axle of the vehicle includes a load on a front wheel.

In various embodiments, the learning load associated with the front axle of the vehicle is based on at least one of a handwheel angle and a steering torque.

In another embodiment, a system of a vehicle includes: a non-transitory computer readable medium configured to store a learned mapping model that maps loads associated with a front axle of the vehicle to a load associated with a trailer tongue; and a computer system onboard the vehicle and configured to, by a processor: initiate steering excitation according to a pattern while the vehicle is stationary: learn a load associated with the front axle of the vehicle based on the steering excitation; translate the load associated with the front axle of the vehicle to a load associated with a tongue of a trailer; and generate a trailer tongue load value based on the load associated with the tongue of the trailer.

In various embodiments, the computer system is further configured to, by a processor: control an automated feature based on the trailer tongue load value.

In various embodiments, the computer system is further configured to, by a processor: generate display data based on the trailer tongue load value.

In various embodiments, the initiating the steering excitation is based on automated control of the steering system.

In various embodiments, the initiating the steering excitation is based on a notification to a driver of the vehicle to steer a steering wheel of the vehicle according to the pattern.

In various embodiments, in response to the initiating the steering excitation, evaluating movement of a front wheel, and wherein the learning is performed in response to the evaluating.

In various embodiments, the computer system is further configured to, by a processor: learn the mapping model based on crowd sourced data.

In the load associated with the front axle of the vehicle includes a load on a front wheel.

In various embodiments, the learning the load associated with the front axle of the vehicle is based on at least one of a handwheel angle and a steering torque.

In another embodiment, a vehicle includes: a hitch configured to couple to a trailer having a trailer tongue; and a computer system configured to, by a processor: initiate steering excitation according to a pattern while the vehicle is stationary: learn a load associated with a front axle of the vehicle based on the steering excitation; translate the load associated with the front axle of the vehicle to a load associated with a tongue of the trailer; and generate a trailer tongue load value based on the load associated with the tongue of the trailer.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
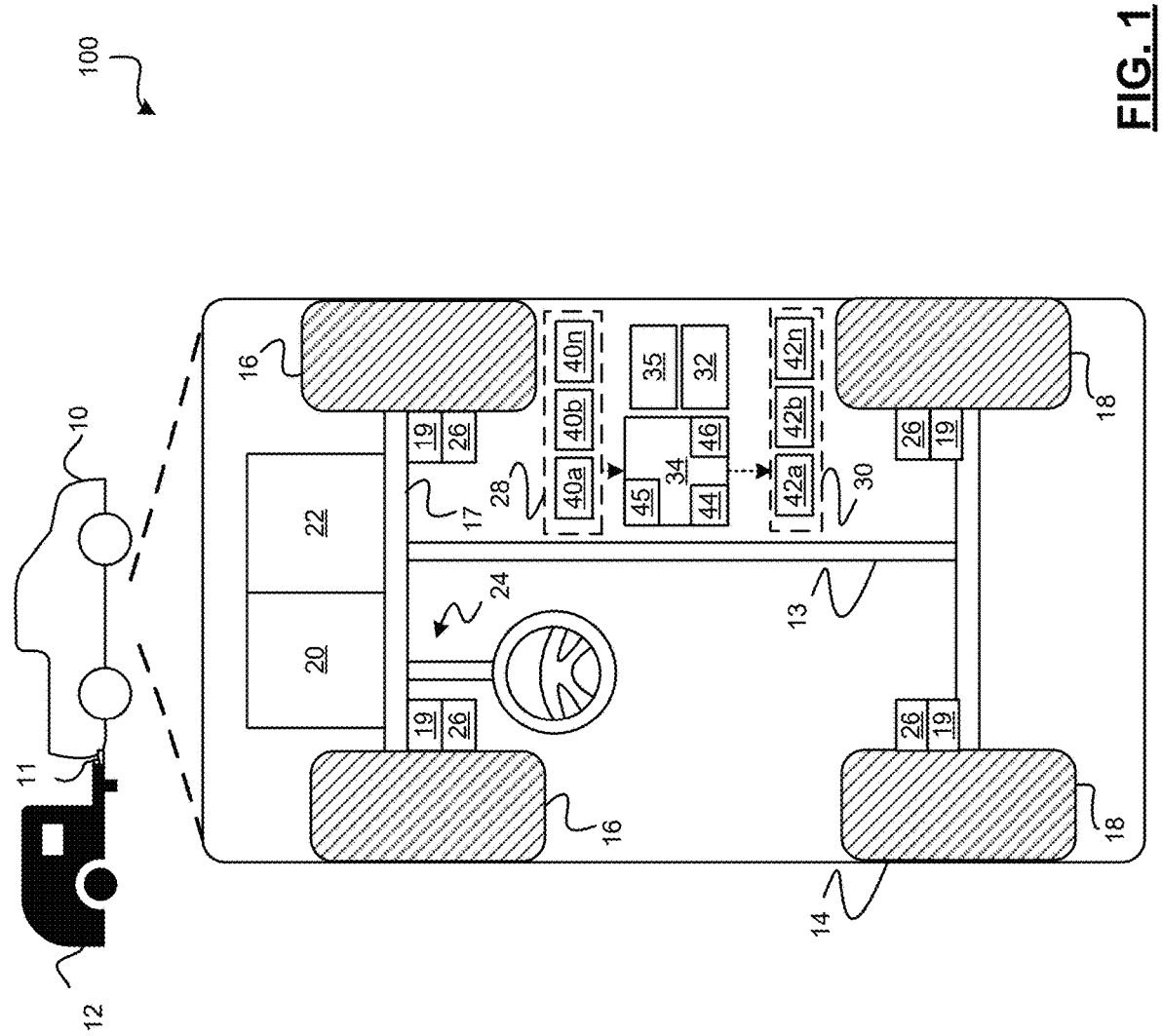
FIG. 1 is a functional block diagram of a vehicle that includes a load estimation system, in accordance with various embodiments.

With reference to FIG. 1, a load estimation system shown generally at 100 is associated with a vehicle 10 in accordance with various embodiments. Generally, the load estimation system 100 estimates a trailer tongue load without requiring the vehicle 10 to move. While the load estimation system 100 can estimate the trailer tongue load while the vehicle 10 is moving, it is not a requirement for the vehicle 10 to be moving. The estimated load is then used in viewing/display, perception, and/or other areas of control of the vehicle 10 such as automated control.

As shown in FIG. 1, the vehicle 10 comprises an automobile configured to tow a trailer 12. The vehicle 10 may be any one of a number of different types of automobiles, such as, for example, a sedan, a wagon, a truck (as shown), or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms and is not limited to an automobile. In various embodiments, the trailer 12 may be any type of towable application having one or more wheels and is not limited to any one embodiment.

The vehicle 10 is configured to couple to and connect to the trailer 12 via a connection apparatus 11 and is configured to tow the trailer 12. In various embodiments, the connection apparatus 11 comprises a hitch mechanism comprising a ball that couples to a tongue of the trailer 12. When coupled to the vehicle 10, the tongue applies a load to the hitch mechanism and thus, the vehicle 10. This load is hereby referred to as the trailer tongue load. In various embodiments, the connection apparatus 11 further comprises a wiring harness configured to communicate power and/or communication signals to and from components of the trailer 12.

As depicted in FIG. 1, the exemplary vehicle 10 generally includes a chassis 13, a body 14, front wheels 16, rear wheels 18, and a suspension system 19. The body 14 is arranged on the chassis 13 and substantially encloses components of the vehicle 10. The body 14 and the chassis 13 may jointly form a frame. The wheels 16-18 are each rotationally coupled to the chassis 13 through the suspension system 19 near a respective corner of the body 14 and an axle 17.

The vehicle 10 further includes a propulsion system 20, a transmission system 22, a steering system 24, a brake system 26, a sensor system 28, an actuator system 30, at least one data storage device 32, at least one controller 34, and a display system 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle and/or of the components of the vehicle itself. The sensing devices 40a-40n can include, but are not limited to, radars, lidars, global positioning systems, optical cameras, thermal cameras, ultrasonic sensors, inertial measurement units, pressure sensors, position sensors, displacement sensors, speed sensors, and/or other sensors.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for controlling the vehicle 10. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMS (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the load estimation system 100 and, when executed by the processor 44, receive data from the sensor system 28 and process the received data in order to determine a trailer tongue load value. For example, the instructions process sensor data in order to determine a load on the front wheels 16 or front axle 17 when the steering system 24 is steering the front wheels according to a defined pattern. The instructions then determine the trailer tongue load value based on the determined load on the front wheels 16 or axle 17.

As can be appreciated, the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to conduct the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
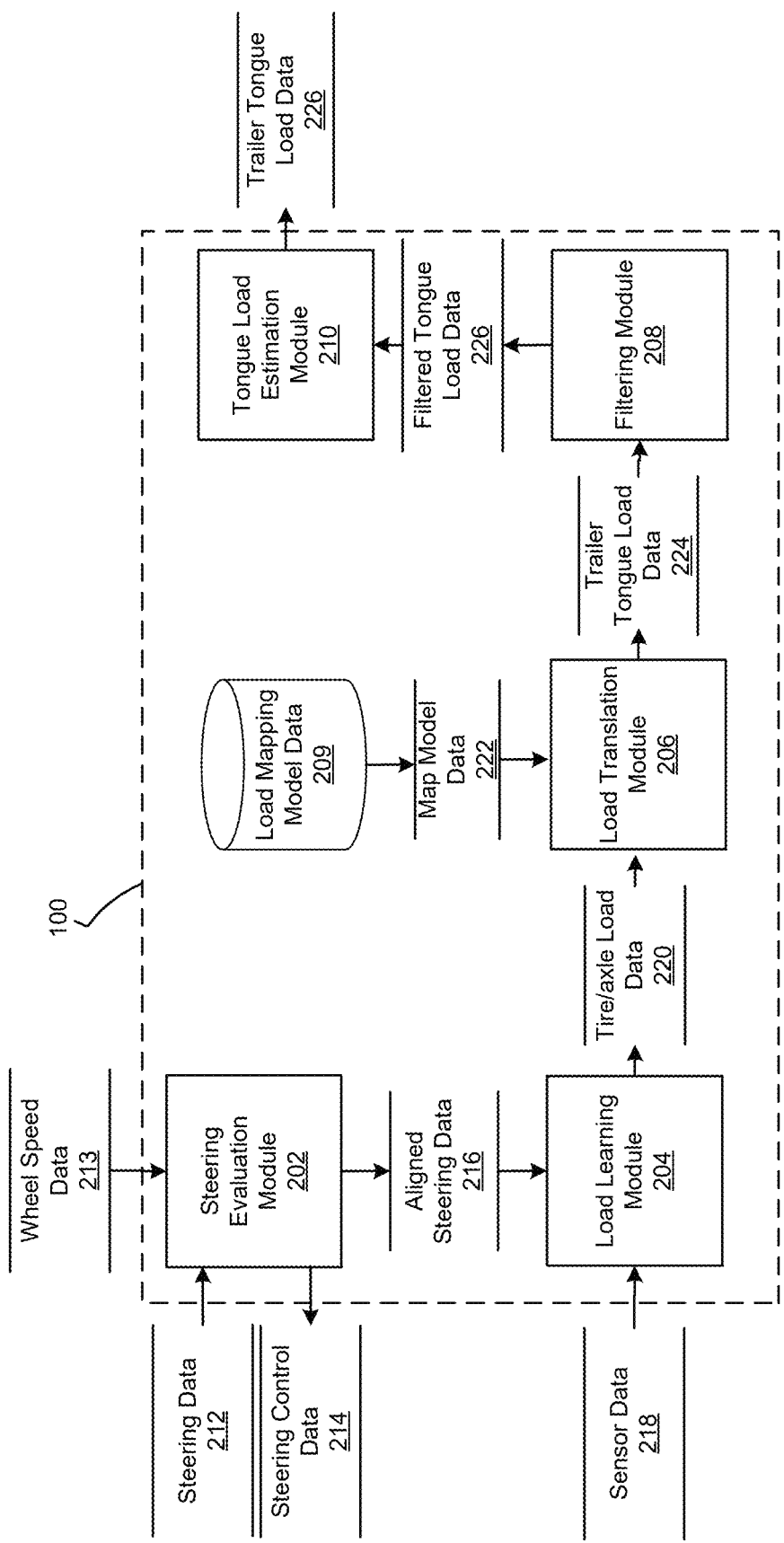
FIG. 2 is a dataflow diagram illustrating elements of the load estimation system of the vehicle of FIG. 1, in accordance with various embodiments.

With reference to FIG. 2 and with continued reference to FIG. 1, a dataflow diagram illustrates elements of the load estimation system 100 of FIG. 1 in accordance with various embodiments. As can be appreciated, various embodiments of the load estimation system 100 according to the present disclosure may include any number of modules embedded within the controller 34 which may be combined and/or further partitioned to similarly implement systems and methods described herein. Furthermore, inputs to the load estimation system 100 may be received from the sensor system 28, received from other control modules (not shown) associated with the vehicle 10 and/or the trailer 12, and/or determined/modeled by other sub-modules (not shown) within the controller 34 of FIG. 1. In various embodiments, the load estimation system 100 includes a steering evaluation module 202, a load learning module 204, load translation module 206, a filtering module 208, a tongue load estimation module 210, and a load mapping model datastore 209.

In various embodiments, the steering evaluation module 202 initiates excitation of the steering system 24 in order to determine the tongue load. For example, the steering evaluation module 202 generates steering control data 214 to automatically steer the wheels 16 of the vehicle 10 according to a defined pattern and/or to notify a driver (e.g., via an HMI of the vehicle 10) to steer the wheels 16 using, for example, the steering wheel according to the defined steering pattern. In various embodiments, the defined steering pattern includes steering of the front wheels 16 back and forth from left to right a number of times to generate handwheel torque data and/or steering angle data in a sinusoidal form.

In various embodiments, in response to the excitation of the steering system 24, the steering evaluation module 202 receives as input steering data 212 including measured handwheel torque, and wheel speed data 213 associated with the front wheels 16 of the vehicle 10. The steering evaluation module 202 evaluates the wheel speed data 213 to ensure that the front wheels 16 are moving in response to the excitation. If the wheels 16 are determined to be moving, the steering evaluation module 202 evaluates the steering data 212 to ensure quality data is received (e.g., using an uncertainty measure and/or covariance measure to exclude signals with noise or other information). Furthermore, the steering data 212 might also be subjected to other preprocessing, such as sub-sampling, normalization, feature-extraction, missing data reduction, and the like. Once the steering data 212 is of sufficient quality, the steering evaluation module 202 aligns the steering data 212 based on time and generates aligned steering data 216 based thereon.

In various embodiments, the load learning module 204 determines the load on the front tires 16 (or the front axle) of the vehicle 10 based on the aligned steering data 216 and other sensor data 218 and generates tire/axle load data 220 based thereon. For example, the load learning module 104 determines the load based on the relationship between the handwheel angle and the resulting steering motor torque where the steering motor torque can be estimated based on the relationship:

$$\tau_{motor} = J_\omega \ddot{\delta} + b_\omega \dot{\delta} + L\left(\delta - \beta - \frac{\omega_z l_f}{v_x}\right). \quad (1)$$

Where $J_\omega$ represents the steering moment of inertia, $\ddot{\delta}$ represents the steering acceleration, $b_\omega$ represents the steering damping, L represents the wheel base, $\beta$ represents the side slip angle, $\omega_z$ represents the yaw rate, $l_f$ represents the distance between center of gravity and the front axle, $v_x$ represents the longitudinal velocity, and $\tau_{motor}$ represents the steering motor torque. As can be appreciated, other methods of determining the steering motor torque and the load associated with the front axle 17 can be implemented based on requested verses commanded steering information in various embodiments.

In various embodiments, the load translation module 206 receives as input the tire/axle load data 220. The load translation module 206 translates the front tires/axle load to a load associated with the trailer tongue and generates trailer tongue load data 224 based thereon. For example, the load translation module 106 translates the load based on a mapping model defined by map model data 222 that maps the tire/axle load to determined tongue loads. In various, embodiments, the mapping model may be learned offline or in real-time and stored in the load mapping model datastore 209. In various embodiments, the mapping model is learned using crowd sourced data from other vehicles.

In various embodiments, the filtering module 208 receives the trailer tongue load data 224. The filtering module 208 filters the trailer tongue load data 224 over time to remove any measurement uncertainties and produces filtered tongue load data 226 based thereon. For example, the filtering module 208 filters the trailer tongue load data 224 using a recursive least squares filter or other filter.

In various embodiments, the tongue load estimation module 210 receives the filtered tongue load data 226 and generates the final trailer tongue load data 228 for use in automated control of the vehicle 10, and/or trailer data display based thereon. For example, the final trailer tongue load data 228 can be provided as a load value in newtons, a percent load of a maximum load, or as an image or display affect representing the load value and/or percent.

Figure 3:
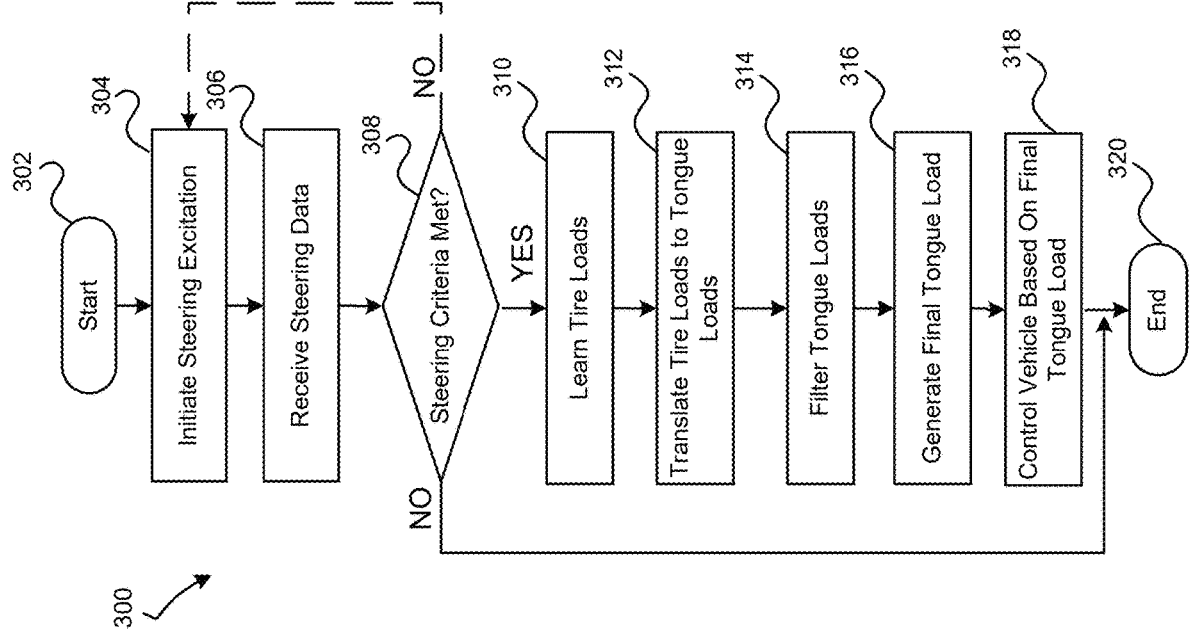
FIG. 3 is a flowchart illustrating a process for determining a tongue load as performed by the load estimation system of the vehicle of FIGS. 1 and 2, in accordance with exemplary embodiments.

With reference now to FIG. 3 and with continued reference to FIGS. 1-2 a flowchart provides a method 300 for determining a trailer tongue load and controlling a vehicle 10 based thereon, in accordance with exemplary embodiments. As can be appreciated in light of the disclosure, the order of operation within the method 300 is not limited to the sequential execution as illustrated in FIG. 3, but may be performed in one or more varying orders as applicable and in accordance with the present disclosure. In various embodiments, the method 300 can be scheduled to run based on one or more predetermined events, and/or can run continuously during operation of the vehicle 10.

In one example, the method 300 may begin at 302. Steering excitation is initiated at 304. For example, control commands are generated to automatically steer the wheels 16 of the vehicle 10 according to a defined pattern and/or notifications are sent to a driver to steer the wheels 16 using, for example, the steering wheel according to a defined pattern.

The steering data is received at 306 and pre-processed at 308. For example, the response of the tires to the steering maneuver is confirmed and quality of the steering data is verified and synchronized as discussed above. Optionally, if the steering criteria is not met, notification data may be generated to notify the automated system or the driver to perform the steering excitation again at 304 or the method 300 may end at 320.

Once the steering criteria has been met at 308, tire/axle loads are learned, for example, based on the relationship discussed above at 310. The estimated tire loads are then translated to a tongue load using the load mapping model at 312.

A filtering method is applied to the tire/axle loads to remove any measurement uncertainties in the translated tongue loads at 314. The final togue load is then determined from the filtered tongue loads at 316. Thereafter, the tongue load is used to control the vehicle 10, and/or for displaying trailer information via an HMI of the vehicle 10. The method 300 may end at 320.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of a vehicle, comprising:
    initiating, by a processor of the vehicle, automatic steering of wheels of the vehicle back and forth a plurality of times according to a defined pattern;
    obtaining, in response to the automatic steering of the wheels according to the defined pattern, steering sensor data including handwheel torque data and wheel speed data in a sinusoidal form;
    determining, by the processor based on the steering sensor data, a handwheel angle and a steering motor torque for the vehicle resulting from the automatic steering of the wheels according to the defined pattern;
    determining, by the processor, a load associated with a front axle of the vehicle based on a relationship between the handwheel angle and the steering motor torque for the vehicle resulting from the automatic steering of the wheels according to the defined pattern;
    translating, by the processor, the load associated with the front axle of the vehicle to a load associated with a tongue of a trailer, based on a mapping model that maps axle load to determined tongue loads; and
    generating, by the processor, a trailer tongue load value based on the load associated with the tongue of the trailer;

wherein the steering motor torque is calculated by the processor in accordance with the following equation:

$$\tau_{motor} = J_\omega \ddot{\delta} + b_\omega \dot{\delta} + L\left(\delta - \beta - \frac{\omega_z l_f}{v_x}\right). \quad (1)$$

in which $J_\omega$ represents steering a moment of inertia for the vehicle, $\ddot{\delta}$ represents steering acceleration of the vehicle, $b_\omega$ represents steering damping for the vehicle, L represents a wheel base of the vehicle, $\beta$ represents a side slip angle for the vehicle, $\omega_z$ represents a yaw rate for the vehicle, $l_f$ represents a distance between a center of gravity for the vehicle and a front axle of the vehicle, $v_x$ represents a longitudinal velocity for the vehicle, and $\tau_{motor}$ represents the steering motor torque.

2. The method of claim 1 further comprising controlling an automated feature of the vehicle based on the trailer tongue load value in combination with percentage of a maximum value of the trailer tongue load for the vehicle represented by the trailer tongue load value.

3. The method of claim 1 further comprising generating display data based on the trailer tongue load value.

4. The method of claim 1 wherein the initiating of the automatic steering of the wheels back and forth according to the defined pattern is based on automated control of a steering system of the vehicle by the processor.

5. The method of claim 1 wherein the initiating of the automatic steering of the wheels back and forth according to the defined pattern is based on a notification provided by the processor to a driver of the vehicle to steer a handwheel of the vehicle according to the defined pattern.

6. The method of claim, 1 the mapping model is determined by the processor based on crowd sourced data from one or more other vehicles.

7. The method of claim 1, further comprising:
generating, via the processor, trailer tongue load data based on the translating;
filtering, via the processor, the trailer tongue load data using a recursive least squares filter, generating filtered trailer tongue data; and
automatically controlling operation of the vehicle, via the processor, based on the filtered trailer tongue load data.

8. A system of a vehicle, comprising:
a non-transitory computer readable medium configured to store a learned mapping model that maps loads associated with a front axle of the vehicle to a load associated with a trailer tongue; and
a computer system onboard the vehicle and configured to, by a processor of the vehicle:
  initiate automatic steering of wheels of the vehicle back and forth a plurality of times according to a defined pattern;
  obtain, in response to the automatic steering of the wheels according to the defined pattern, steering sensor data including handwheel torque data and wheel speed data in a sinusoidal form;
  determine, based on the steering sensor data, a handwheel angle and a steering motor torque for the vehicle resulting from the automatic steering of the wheels according to the defined pattern;
  determine a load associated with the front axle of the vehicle based on a relationship between the handwheel angle and the steering motor torque for the vehicle resulting from the automatic steering of the wheels according to the defined pattern;
  translate the load associated with the front axle of the vehicle to a load associated with a tongue of a trailer, based on a mapping model that maps axle load to determined tongue loads; and
  generate a trailer tongue load value based on the load associated with the tongue of the trailer;
wherein the processor is further configured to calculate the steering motor torque in accordance with the following equation:

$$\tau_{motor} = J_\omega \ddot{\delta} + b_\omega \dot{\delta} + L\left(\delta - \beta - \frac{\omega_z l_f}{v_x}\right). \quad (1)$$

in which $J_\omega$ represents steering a moment of inertia for the vehicle, $\ddot{\delta}$ represents steering acceleration of the vehicle, $b_\omega$ represents steering damping for the vehicle, L represents a wheel base of the vehicle, $\beta$ represents a side slip angle for the vehicle, $\omega_z$ represents a yaw rate for the vehicle, $l_f$ represents a distance between a center of gravity for the vehicle and a front axle of the vehicle, $v_x$ represents a longitudinal velocity for the vehicle, and $\tau_{motor}$ represents the steering motor torque.

9. The system of claim 8, wherein the computer system is further configured to, by the processor: control an automated feature of the vehicle based on the trailer tongue load value in combination with a maximum value of the trailer tongue load for the vehicle.

10. The system of claim 8, wherein the computer system is further configured to, by the processor: generate display data based on the trailer tongue load value.

11. The system of claim 8, wherein the initiating of the automatic steering of the wheels back and forth according to the defined pattern is based on automated control of a steering system of the vehicle by the processor.

12. The system of claim 8, wherein the initiating of the automatic steering of the wheels back and forth according to the defined pattern is based on a notification provided by the processor to a driver of the vehicle to steer a handwheel of the vehicle according to the defined pattern.

13. The system of claim 8, wherein the computer system is further configured to, by the processor: determine the mapping model based on crowd sourced data from one or more other vehicles.

14. The system of claim 8, wherein the processor is further configured to at least facilitate:
generating trailer tongue load data based on the translating;
filtering the trailer tongue load data using a recursive least squares filter, generating filtered trailer tongue data; and
automatically controlling operation of the vehicle based on the filtered trailer tongue load data.

15. A vehicle, comprising:
a hitch configured to couple to a trailer having a trailer tongue; and
a computer system configured to, by a processor:
  initiate automatic steering of wheels of the vehicle back and forth a plurality of times according to a defined pattern;
  obtain, in response to the automatic steering of the wheels according to the defined pattern, steering sensor data including handwheel torque data and wheel speed data in a sinusoidal form;
  determine, based on the steering sensor data, a handwheel angle and a steering motor torque for the vehicle resulting from the automatic steering of the wheels according to the defined pattern;

a load associated with the front axle of the vehicle based on a relationship between the handwheel angle and the steering motor torque for the vehicle resulting from the automatic steering of the wheels according to the defined pattern;

translate the load associated with the front axle of the vehicle to a load associated with a tongue of a trailer, based on a mapping model that maps axle load to determined tongue loads; and generate a trailer tongue load value based on the load associated with the tongue of the trailer;

wherein the processor is further configured to calculate the steering motor torque in accordance with the following equation:

$$\tau_{motor} = J_\omega \ddot{\delta} + b_\omega \dot{\delta} + L\left(\delta - \beta - \frac{\omega_z l_f}{v_x}\right). \quad (1)$$

in which $J_\omega$ represents steering a moment of inertia for the vehicle, $\ddot{\delta}$ represents steering acceleration of the vehicle, $b_\omega$ represents steering damping for the vehicle, L represents a wheel base of the vehicle, $\beta$ represents a side slip angle for the vehicle, $\omega_z$ represents a yaw rate for the vehicle, $l_f$ represents a distance between a center of gravity for the vehicle and a front axle of the vehicle, $v_x$ represents a longitudinal velocity for the vehicle, and $\tau_{motor}$ represents the steering motor torque.

16. The vehicle of claim 15, wherein the processor is further configured to at least facilitate:

generating trailer tongue load data based on the translating;

filtering the trailer tongue load data using a recursive least squares filter, generating filtered trailer tongue data; and automatically controlling operation of the vehicle based on the filtered trailer tongue load data.

* * * * *